(12) United States Patent
Takahashi et al.

(10) Patent No.: US 11,303,407 B2
(45) Date of Patent: Apr. 12, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, New Territories (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 62 days.

(21) Appl. No.: 16/636,921

(22) PCT Filed: Jun. 13, 2018

(86) PCT No.: PCT/JP2018/022608
§ 371 (c)(1),
(2) Date: Feb. 6, 2020

(87) PCT Pub. No.: WO2019/031058
PCT Pub. Date: Feb. 14, 2019

(65) Prior Publication Data
US 2020/0244414 A1     Jul. 30, 2020

(30) Foreign Application Priority Data

Aug. 9, 2017   (JP) .............................. JP2017-154085

(51) Int. Cl.
*H04L 5/00* (2006.01)
*H04B 17/318* (2015.01)
*H04W 16/28* (2009.01)

(52) U.S. Cl.
CPC ......... *H04L 5/0048* (2013.01); *H04B 17/318* (2015.01); *H04L 5/001* (2013.01); *H04L 5/0023* (2013.01); *H04W 16/28* (2013.01)

(58) Field of Classification Search
CPC ... H04L 5/0048; H04L 5/0023; H04L 5/0094; H04L 5/001; H04B 17/318; H04W 16/28; H04W 24/10
See application file for complete search history.

(56) References Cited

U.S. PATENT DOCUMENTS

| | | | |
|---|---|---|---|
| 2017/0055187 A1* | 2/2017 | Kang | H04W 36/0058 |
| 2018/0167883 A1* | 6/2018 | Guo | H04W 72/02 |

(Continued)

OTHER PUBLICATIONS

TS 5G.321 V1.2, Sep. 2016 (Year: 2016).*

(Continued)

*Primary Examiner* — Jae Y Lee
*Assistant Examiner* — Aixa A Guadalupe Cruz
(74) *Attorney, Agent, or Firm* — Keating & Bennett, LLP

(57) ABSTRACT

Terminal apparatuses (1, 1A, and 1B) efficiently communicate with a base station apparatus (3). The terminal apparatuses (1, 1A, and 1B): receive multiple downlink signals in downlink in one or multiple serving cells; monitor a beam state of the downlink, based on the multiple downlink signals received; generate a first MAC CE including first information indicating the beam state of the downlink of at least one of the one or multiple serving cells and second information identifying a serving cell of the one or multiple serving cells corresponding to the beam state indicated by the first information, and generate a first MAC PDU including the first MAC CE; and transmit the first MAC PDU.

8 Claims, 11 Drawing Sheets

(56) References Cited

U.S. PATENT DOCUMENTS

2018/0199226 A1\* 7/2018 Tsai .................. H04W 24/10
2019/0356439 A1\* 11/2019 Lee .................. H04B 7/0408

OTHER PUBLICATIONS

Official Communication issued in International Patent Application No. PCT/JP2018/022608, dated Jul. 24, 2018.
Nokia et al., "On beam grouping and reporting", 3GPP TSG-RAN WG1 Meeting #89, R1-1708907, May 15-19, 2017, 13 pages.
Nokia et al., "Beam Management—Beam Reporting", 3GPP TSG-RAN WG1#88, R1-1703162, Feb. 13-17, 2017, 6 pages.
Ericsson, "Overview of NR", TSG-RAN WG1 #84bis, R1-163215, Apr. 11-15, 2016, 2 pages.
Intel Corporation, "Overview of antenna technology for new radio interface", 3GPP TSG-RAN WG1 #84bis, R1-162380, Apr. 11-15, 2016, pp. 1-3.
Nokia et al., "Basic principles for the 5G New Radio access technology", 3GPP TSG-RAN WG1 #84bis, R1-162883, Apr. 11-15, 2016, 6 pages.
NTT Docomo, "Revision of SI: Study on New Radio Access Technology", 3GPP TSG RAN Meeting #72, RP-161214, Jun. 13-16, 2016, 8 pages.

\* cited by examiner

TERMINAL APPARATUS, BASE STATION APPARATUS, AND COMMUNICATION METHOD

TECHNICAL FIELD

One aspect of the present invention relates to a terminal apparatus, a communication method, and an integrated circuit.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

For NR, technical studies of massive Multiple-Input Multiple-Output (MIMO), which uses a large number of antenna elements at high frequencies to secure coverage with beamforming gain are conducted (NPL 2, NPL 3, and NPL 4).

CITATION LIST

Non Patent Literature

NPL 1: RP-161214 NTT DOCOMO, "Revision of SI: Study on New Radio Access Technology", June 2016

NPL 2: R1-162883 Nokia, Alcatel-Lucent ShanghaiBell, "Basic Principles for the 5G New Radio Access technology", April 2016

NPL 3: R1-162380, Intel Corporation, "Overview of antenna technology for new radio interface", April 2016

NPL 4: R1-163215, Ericsson, "Overview of NR", April 2016

SUMMARY OF INVENTION

Technical Problem

The present invention provides a terminal apparatus capable of efficiently communicating with a base station apparatus, a base station apparatus communicating with the terminal apparatus, a communication method used for the terminal apparatus, and a communication method used for the base station apparatus. For example, the communication methods used for the terminal apparatus and the base station apparatus may include an uplink transmission method, a modulation method, and/or a coding method for efficient communication, reduction in complexity, and reducing interference between cells and/or between terminal apparatuses.

Solution to Problem (1) According to some aspects of the present invention, the following measures are provided. Specifically, a first aspect of the present invention is a terminal apparatus including: a receiver configured to receive multiple downlink signals in downlink in one or multiple serving cells; a monitor unit configured to monitor a beam state of the downlink in each of the one or multiple serving cells, based on the multiple downlink signals received in the downlink of each of the one or multiple serving cells; a generation unit configured to generate a first MAC CE including first information indicating the beam state of the downlink of at least one of the one or multiple serving cells and second information identifying a serving cell of the one or multiple serving cells corresponding to the beam state indicated by the first information, and generate a first MAC PDU including the first MAC CE; and a transmitter configured to transmit the first MAC PDU.

(2) A second aspect of the present invention is a base station apparatus including: a transmitter configured to transmit multiple downlink signals in downlink in one or multiple serving cells to a terminal apparatus; and a receiver configured to receive a first MAC PDU including a first MAC CE from the terminal apparatus, wherein the first MAC CE includes first information indicating a beam state of the downlink of at least one of the one or multiple serving cells and second information identifying a serving cell of the one or multiple serving cells corresponding to the beam state indicated by the first information, and the beam state of the downlink indicated by the first information is based on the multiple downlink signals.

(3) A third aspect of the present invention is a communication method used for a terminal apparatus, the communication method including: receiving multiple downlink signals in downlink in one or multiple serving cells; monitoring a beam state of the downlink in each of the one or multiple serving cells, based on the multiple downlink signals received in the downlink of each of the one or multiple serving cells; generating a first MAC CE including first information indicating the beam state of the downlink of at least one of the one or multiple serving cells and second information identifying a serving cell of the one or multiple serving cells corresponding to the beam state indicated by the first information, and generate a first MAC PDU including the first MAC CE; and transmitting the first MAC PDU.

(4) A fourth aspect of the present invention is a communication method used for a base station apparatus, the communication method including: transmitting multiple downlink signals in downlink in one or multiple serving cells to a terminal apparatus; and receiving a first MAC PDU including a first MAC CE from the terminal apparatus, wherein the first MAC CE includes first information indicating a beam state of the downlink of at least one of the one or multiple serving cells and second information identifying a serving cell of the one or multiple serving cells corresponding to the beam state indicated by the first information, and the beam state of the downlink indicated by the first information is based on the multiple downlink signals.

Advantageous Effects of Invention

According to the present invention, a terminal apparatus and a base station apparatus can efficiently communicate with each other and/or reduce complexity.

DESCRIPTION OF EMBODIMENTS

Embodiments of the present invention will be described below.

LTE (and LTE-Advanced Pro) and NR may be defined as different Radio Access Technologies (RATs). NR may be defined as a technology included in LTE. The present embodiment may be applied to NR, LTE and other RATs. Terms associated with LTE are used in the following description. However, the present invention may be applied to other technologies using other terms.

Figure 1:
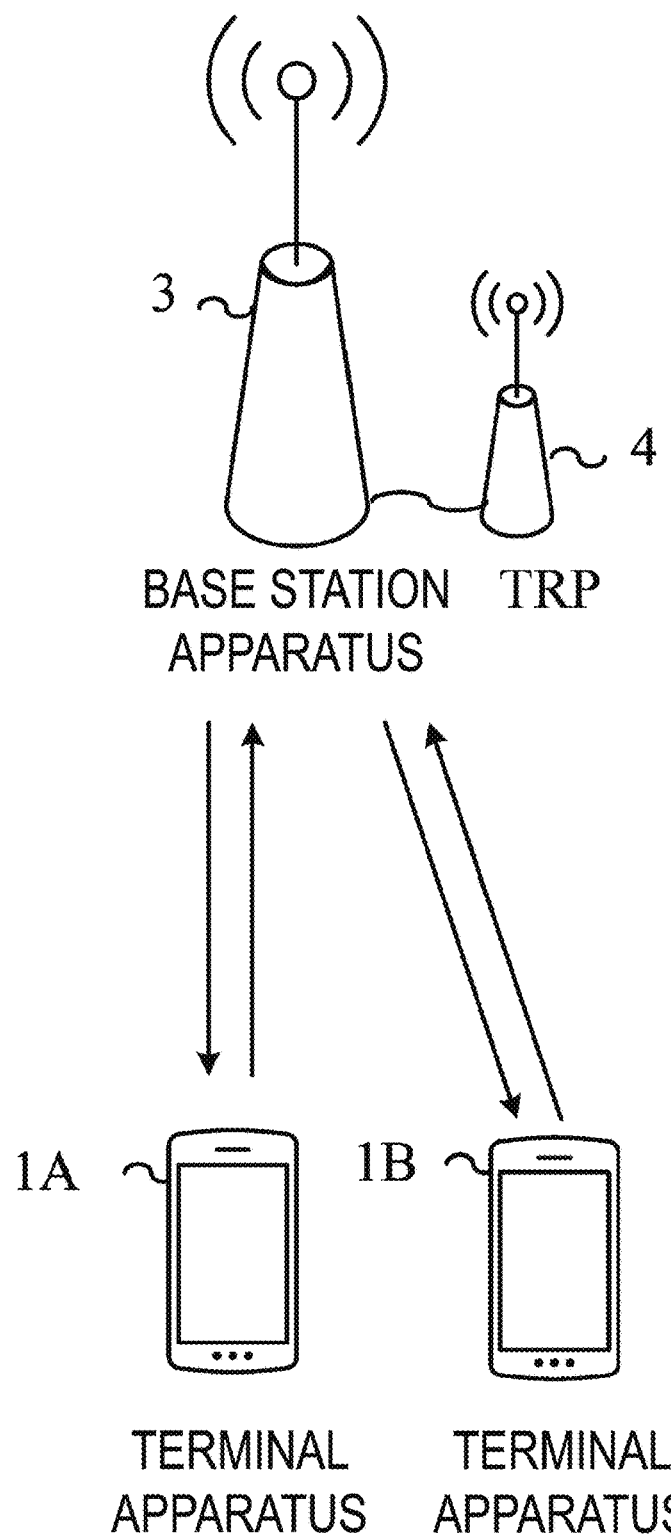
FIG. 1 is a conceptual diagram of a radio communication system according to an embodiment of the present invention.

FIG. 1 is a conceptual diagram of a radio communication system according to an embodiment of the present invention. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1.

The terminal apparatus 1 may also be referred to as a mobile station apparatus, a user terminal (User Equipment (UE)), a communications terminal, a mobile device, a terminal, a Mobile Station (MS), and the like. The base station apparatus 3 may also be referred to as a radio base station apparatus, a base station, a radio base station, a fixed station, a Node B (NB), an evolved Node B (eNB), an NR Node B (NR NB), a next generation Node B (gNB), an access point, a Base Transceiver Station (BTS), a Base Station (BS), and the like. The base station apparatus 3 may include a core network apparatus. Furthermore, the base station apparatus 3 may include one or more transmission reception points (TRPs) 4. At least some of the functions/processes of the base station apparatus 3 described below may be function/processes at each of the transmission reception points 4 included in the base station apparatus 3. The base station apparatus 3 may have a communicable range (communication area), controlled by the base station apparatus 3, that includes one or more cells to serve the terminal apparatus 1. Furthermore, the base station apparatus 3 may have a communicable range (communication area), controlled by one or more transmission reception points 4, that includes one or more cells to serve the terminal apparatus 1. Furthermore, one cell may be divided into multiple beamed areas, and the terminal apparatus 1 may be served in each of the Beamed areas. Here, a beamed area may be identified based on a beam index used for beamforming or a precoding index.

The communication area covered by the base station apparatus 3 may be different in size and shape for each frequency. Moreover, the covered area may be different for each frequency. Furthermore, a radio network, in which cells having different types of base station apparatuses 3 and different cell radii coexist on the same frequency or different frequencies to form one communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 1 and the base station apparatus 3 and/or the radio communication between the terminal apparatus 1 and another terminal apparatus 1.

In FIG. 1, in the radio communication between the terminal apparatus 1 and the base station apparatus 3 and/or the radio communication between the terminal apparatus 1 and the other terminal apparatus 1, Universal-Filtered Multi-Carrier (UFMC), Filtered OFDM (F-OFDM), OFDM in which a window is multiplied (Windowed OFDM), and Filter-Bank Multi-Carrier (FBMC) may be used.

Note that the present embodiment will be described by using OFDM symbol with the assumption that a transmission scheme is OFDM, and use of any other transmission scheme is also included in the present invention. For example, the OFDM symbol in the present embodiment may be an SC-FDM symbol (which may also be referred to as a Single-Carrier Frequency Division Multiple Access (SC-FDMA) symbol).

In FIG. 1, the aforementioned transmission scheme that uses no CP or uses zero padding instead of the CP may be employed for the radio communication between the terminal apparatus 1 and the base station apparatus 3 and/or the radio communication between the terminal apparatus 1 and the other terminal apparatus 1. Moreover, the CP or zero padding may be added both forward and backward.

Physical channels and physical signals according to the present embodiment will be described. However, the downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as physical channels. The downlink physical signals and/or the uplink physical signals may be collectively referred to as physical signals.

In FIG. 1, in downlink radio communication between the terminal apparatus 1 and the base station apparatus 3, the following downlink physical channels are used. The downlink physical channels are used for transmitting information output from the higher layer.

New Radio Physical Broadcast CHannel (NR-PBCH)
New Radio Physical Downlink Control CHannel (NR-PDCCH)
New Radio Physical Downlink Shared CHannel (NR-PDSCH)

The NR-PBCH is used for the base station apparatus 3 to broadcast an important information block (Master Information Block (MIB), Essential Information Block (EIB)) including important system information (Essential information) required by the terminal apparatus 1. Here, one or more important information blocks may be transmitted as important information messages. For example, the important information blocks may include information indicating some or all of frame numbers (System Frame Numbers (SFNs)) (for example, information about the location in the superframe composed of multiple frames). For example, a radio frame (10 ms) includes 10 1 ms subframes, and the radio frame is identified by the frame number. The frame number returns to 0 at 1024 (Wrap around). In addition, in a case that a different important information block is transmitted for each region within a cell, information for identifying the region (for example, an identifier information of a base station transmission beam for configuring the region) may be included. Here, the identifier information of the base station transmission beam may be indicated by using an index of the base station transmission beam (precoding). Furthermore, in a case that a different important information block (important information message) is transmitted for each region within the cell, information for identifying a time location within the frame (for example, a subframe number in which the important information block (important information message) is included) may be included. That is, information for determining each of the subframe numbers in which the respective important information blocks (important information messages) using different base station transmission beam indexes are transmitted may be included. For example, information necessary for connection to the cell and for mobility may be included in the important information.

In downlink radio communication (radio communication from the base station apparatus 3 to the terminal apparatus 1), the NR-PDCCH is used to transmit Downlink Control Information (DCI). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating a timing for transmitting HARQ-ACK with respect to a scheduled NR-PDSCH (for example, the number of symbols from the last symbol included in the NR-PDSCH to the symbol for transmission of the HARQ-ACK).

For example, the DCI may be defined to be used for the scheduling of a downlink radio communication NR-PDSCH in a cell (transmission of a downlink transport block).

For example, the DCI may be defined to be used for the scheduling of an uplink radio communication NR-PUSCH in a cell (transmission of an uplink transport block).

Here, the DCI includes information about the scheduling of the NR-PDSCH or the NR-PUSCH. Here, the DCI for the downlink is also referred to as downlink grant or downlink assignment. Here, the DCI for the uplink is also referred to as uplink grant or Uplink assignment.

The NR-PDSCH is used to transmit downlink data (Downlink Shared CHannel (DL-SCH)) from Medium Access (Medium Access Control (MAC)). Furthermore, the NR-PDSCH is used to transmit System Information (SI), a Random Access Response (PAR), and the like.

Here, the base station apparatus 3 and the terminal apparatus 1 exchange (transmit and/or receive) signals with each other in higher layers. For example, the base station apparatus 3 and the terminal apparatus 1 may transmit and/or receive radio resource control (RRC) signaling (also referred to as RRC message or RRC information) in the RRC layer, respectively. The base station apparatus 3 and the terminal apparatus 1 may transmit and/or receive a Medium Access Control (MAC) control element in the Medium Access Control (MAC) layer. Here, the RRC signaling and/or the MAC control element is also referred to as higher layer signaling. Here, the higher layer means a higher layer viewed from the physical layer, and thus may include one or more of the MAC layer, the RRC layer, the RLC layer, the PDCP layer, the NAS layer, and the like. For example, in the processing of the MAC layer, the higher layer may include one or more of the RRC layer, the RLC layer, the PDCP layer, the NAS layer, and the like.

The NR-PDSCH may be used to transmit RRC signaling and the MAC control element (Medium Access Control Control Element (MAC CE)). Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1.

The NR-PRACH may be used to transmit a random access preamble. The NR-PRACH may be used for indicating the initial connection establishment procedure, the handover procedure, the connection re-establishment procedure, synchronization (timing adjustment) for uplink transmission, and a request for an NR-PUSCH (UL-SCH) resource.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal is used for the terminal apparatus 1 to establish synchronization in a frequency domain and a time domain in the downlink. The synchronization signal may include a Primary Synchronization Signal (PSS) and a Secondary Synchronization Signal (SSS). The synchronization signal may be used for the terminal apparatus 1 to identify a Cell Identifier (cell ID). The synchronization signal may also be used to select/identify/determine a base station transmission beam to be used by the base station apparatus 3 for downlink beamforming, and/or a terminal reception beam to be used by the terminal apparatus 1. In other words, the synchronization signal may be used to allow the terminal apparatus 1 to select/identify/determine the index of the base station transmission beam applied to the downlink signal by the base station apparatus 3. However, the synchronization signal used in NR, the primary synchronization signal, and the secondary synchronization signal may be referred to as an NR-SS, an NR-PSS, and an NR-SSS, respectively.

The downlink reference signal (hereinafter, also simply referred to as a reference signal in the present embodiment)

may be classified into multiple reference signals, based on applications and the like. For example, one or more of the following reference signals may be used for the reference signal.

Demodulation Reference Signal (DMRS)
Channel State Information Reference Signal (CSI-RS)
Phrase Tracking Reference Signal (PTRS)
Mobility Reference Signal (MRS)

The DMRS may be used for channel compensation during demodulation of the received modulated signal. As the DMRS, DMRSs for demodulating the NR-PDSCH, for demodulating the NR-PDCCH, and/or for demodulating the NR-PBCH may be collectively referred to as DMRSs, or each may be defined individually.

The CSI-RS may be used for channel state measurement. The PTRS may be used to track phases according to movement of the terminal or the like. The MRS may be used to measure received qualities from multiple base station apparatuses for handover.

Furthermore, the reference signal may be defined as a reference signal for compensating for phase noise.

However, among at least some of the multiple reference signals described above, other reference signals may have the functions.

Moreover, at least one of the multiple reference signals or other reference signal may be defined as a Cell-specific reference signal (CRS) configured individually for a cell, a Beam-specific reference signal (BRS) for each transmission beam used by the base station apparatus 3 or the transmission reception points 4, and/or a terminal-specific reference signal (UE-specific reference signal (URS)) configured individually for the terminal apparatus 1.

Furthermore, at least one of the reference signals may be used for a numerology such as a radio parameter or subcarrier spacing, or used for Fine synchronization that allows FFT window synchronization to be achieved.

At least one of the reference signals may also be used for Radio Resource Measurement (RRM). At least one of the reference signals may also be used for beam management.

A synchronization signal may also be used for at least one of the reference signals.

In FIG. 1, in uplink radio communication between the terminal apparatus 1 and the base station apparatus 3 (radio communication from the terminal apparatus 1 to the base station apparatus 3), the following uplink physical channels are used. The uplink physical channels are used for transmitting information output from a higher layer.

New Radio Physical Uplink Control CHannel (NR-PUCCH)
New Radio Physical Uplink Shared CHannel (NR-PUSCH)
New Radio Physical Random Access CHannel (NR-PRACH)

The NR-PUCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared CHannel (DL-SCH)).

The NR-PUSCH is used to transmit uplink data (Uplink Shared CHannel (UL-SCH)) from Medium Access Control (MAC). The NR-PUSCH may be used to transmit a HARQ-ACK and/or CSI along with the uplink data. Furthermore, the NR-PUSCH may be used to transmit the CSI only or the HARQ-ACK and the CSI only. In other words, the NR-PUSCH may be used to transmit the UCI only.

The NR-PUSCH may be used to transmit the RRC signaling and the MAC control element. Here, the NR-PUSCH may be used to transmit the UE Capability in the uplink.

Note that the same name (for example, NR-PCCH) and the same channel definition may be used for the NR-PDCCH and the NR-PUCCH. The same name (for example, NR-PSCH) and the same channel definition may be used for the NR-PDSCH and the NR-PUSCH.

The subframe will now be described. The subframe in the present embodiment may also be referred to as a resource unit, a radio frame, a time period, or a time interval.

Figure 2:
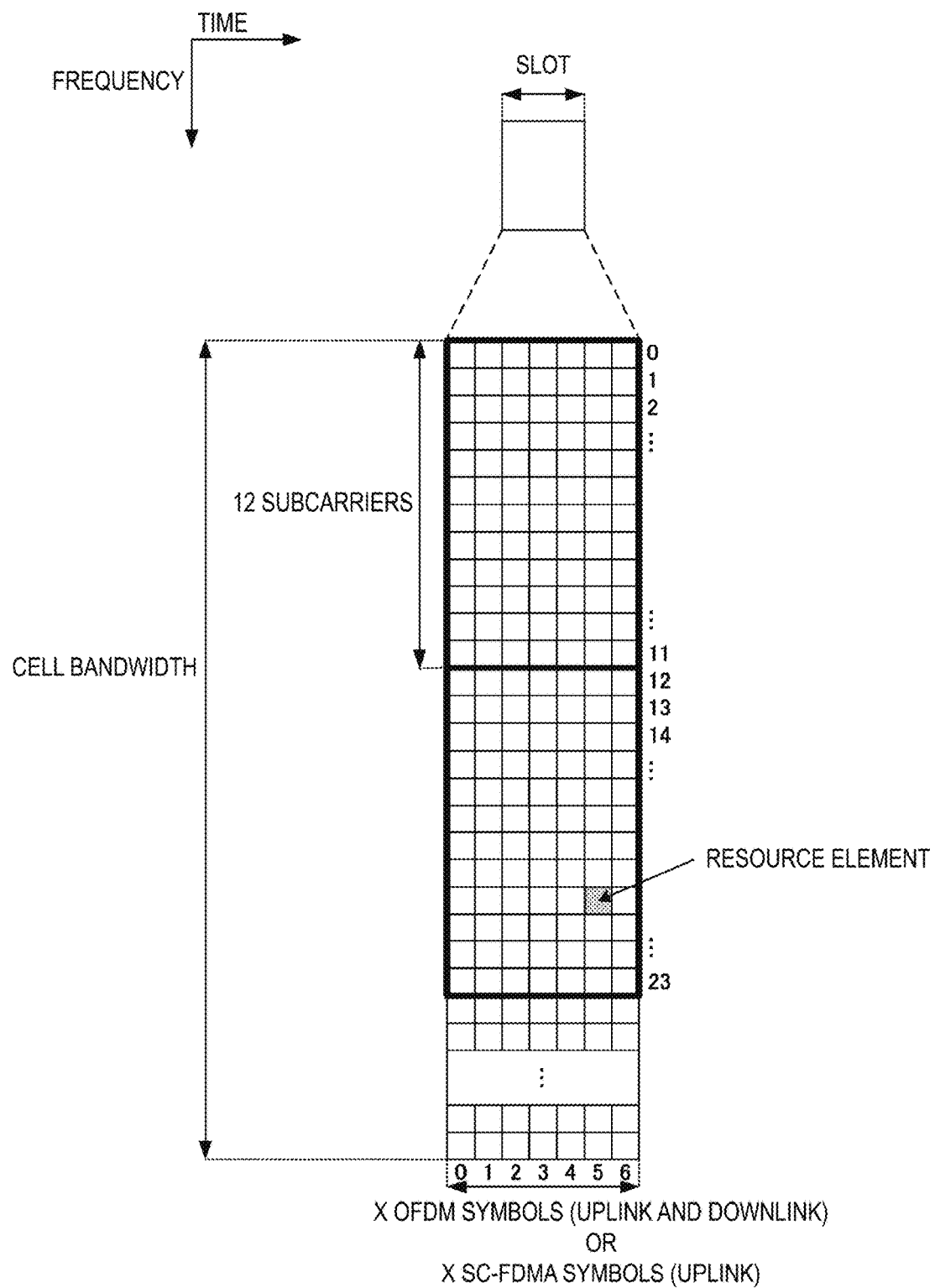
FIG. 2 is a diagram illustrating an example of a schematic configuration of a downlink slot according to an embodiment of the present invention.

FIG. 2 is a diagram illustrating an example of a schematic configuration of a downlink slot according to the embodiment of the present invention. Each of radio frames is 10 ms in length. Furthermore, each of the radio frames includes 10 subframes and X slots. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X is equal to 7 or X is equal to 14, and X=7 and X=14 correspond to 0.5 ms and 1 ms, respectively. In addition, in a case that the subcarrier spacing is 60 kHz, X is equal to 7 or X is equal to 14, and X=7 and X=14 correspond to 0.125 ms and 0.25 ms, respectively. FIG. 2 illustrates a case of X=7 as an example. Note that the case of X=14 can be similarly configured by expanding the case of X=7. Furthermore, the uplink slot is defined similarly, and the downlink slot and the uplink slot may be defined separately.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case that the number X of OFDM symbols included in a slot is 7 and NCPs are used, one physical resource block is defined by 7 consecutive OFDM symbols in the time domain and by 12 consecutive subcarriers in the frequency domain. Hence, one physical resource block includes (7×12) resource elements. In a case of Extended CPs (ECPs), one physical resource block is defined by, for example, 6 consecutive OFDM symbols in the time domain and by 12 consecutive subcarriers in the frequency domain. Hence, one physical resource block includes (6×12) resource elements. At this time, one physical resource block corresponds to one slot in the time domain and corresponds to 180 kHz in the frequency domain. Physical resource blocks are numbered from 0 in the frequency domain.

Figure 3:
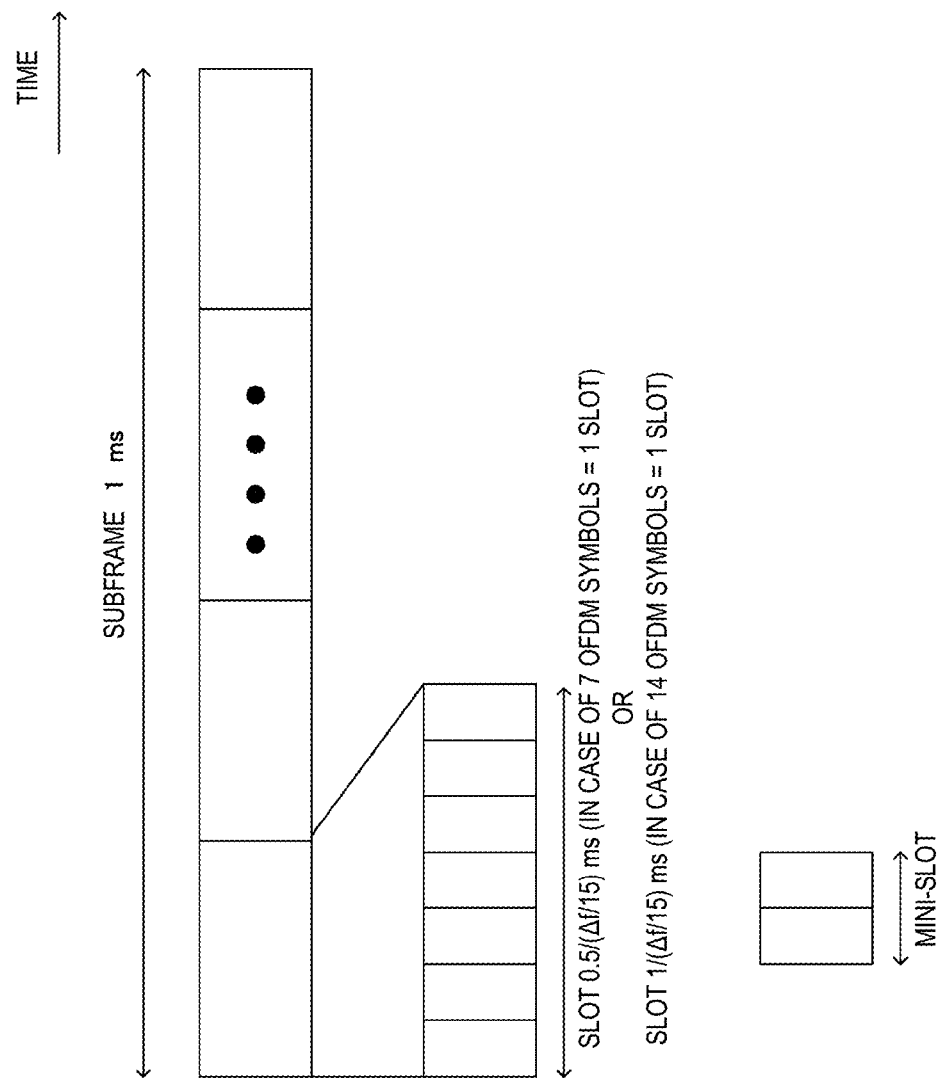
FIG. 3 is a diagram illustrating a relationship between a subframe and a slot and a mini-slot in a time domain according to an embodiment of the present invention.

The subframe, the slot, and a mini-slot will now be described. FIG. 3 is a diagram illustrating the relationship between the subframe and the slot and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe. Thus, with the assumption that the subcarrier spacing is $\Delta f$ (kHz), the slot length may be defined as $0.5/(\Delta f/15)$ ms in the case that the number of OFDM symbols constituting one slot is 7. Here, $\Delta f$ may be defined by subcarrier spacing (kHz). In addition, in the case that the number of OFDM symbols constituting one slot is 7, the slot length may be defined as $1/(\Delta f/15)$ ms. Here, $\Delta f$ may be defined by subcarrier spacing (kHz). Furthermore, the slot length may be defined as $X/14/(\Delta f/15)$ ms, where X is the number of OFDM symbols included in the slot.

The mini-slot (which may be referred to as a sub-slot) is a time unit including OFDM symbols that are less in number than the OFDM symbols included in the slot. FIG. 3 illustrates, by way of example, a case in which the mini-slot includes 2 OFDM symbols. The OFDM symbols in the mini-slot may match the timing for the OFDM symbols constituting the slot. Note that the smallest unit of scheduling may be a slot or a mini-slot.

Figure 4:
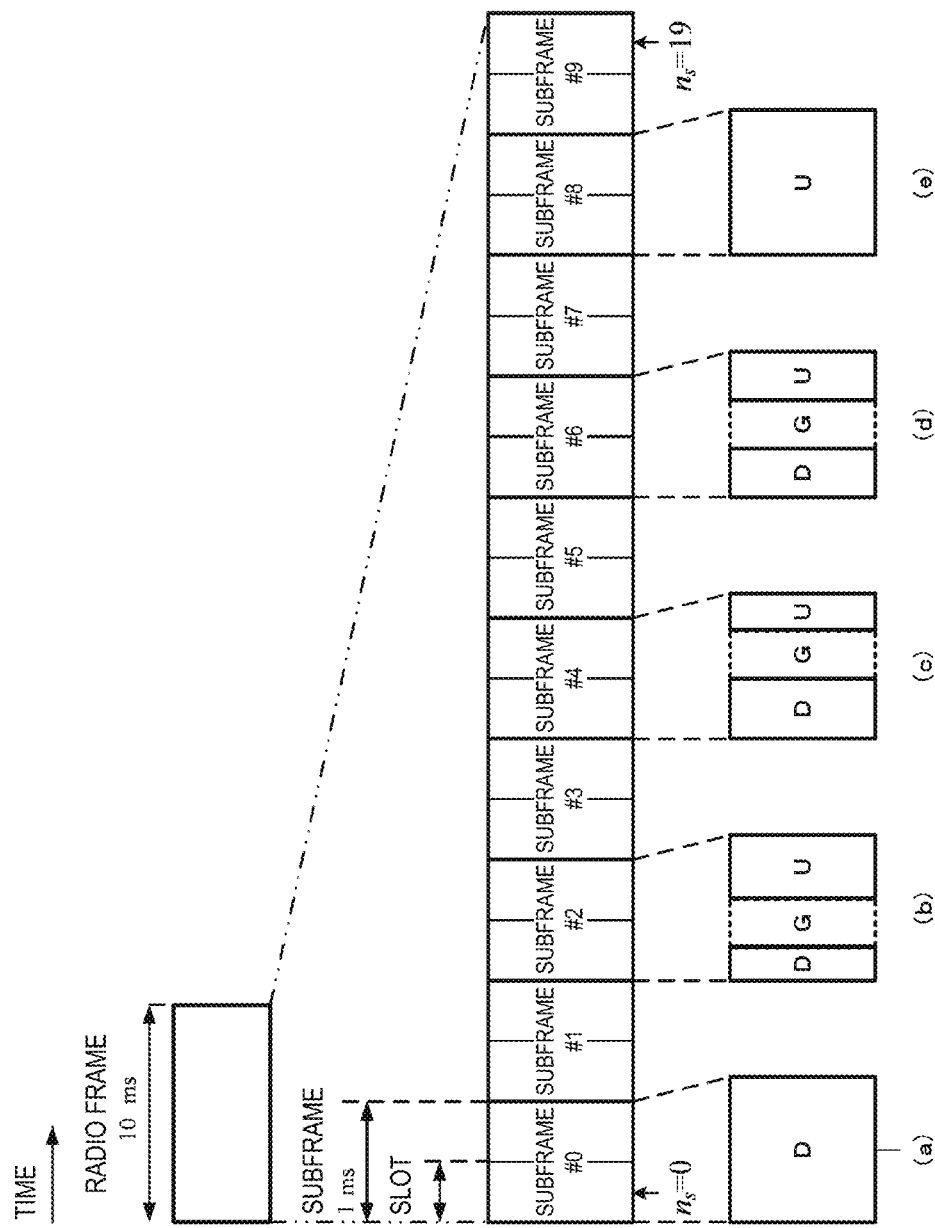
FIG. 4 is a diagram illustrating an example of a slot or a subframe according to an embodiment of the present invention.

FIG. 4 illustrates an example of a slot or a subframe. Here, a case in which the slot length is 0.5 ms at a subcarrier spacing of 15 kHz is illustrated as an example. In FIG. 4, D represents the downlink, and U represents the uplink. As illustrated in FIG. 4, during a certain time period (for example, the minimum time period to be allocated to one UE in the system), the subframe may include at least one of the followings:

downlink part (duration), gap, or uplink part (duration).

In a subframe of FIG. 4(a), the entire subframe is used for downlink transmission during a certain time period (which may be referred to as, for example, a minimum unit of time resource that can be allocated to one UE, or a time unit. Furthermore, multiple minimum units of time resources that are bundled may be referred to as a time unit). In a subframe of FIG. 4(b), an uplink is scheduled via the PCCH for example by using the first time resource, and an uplink signal is transmitted after a gap for a processing delay of the PCCH, a time for switching from a downlink to an uplink, and generation of a transmit signal. In a subframe of FIG. 4(c), a downlink PCCH and/or downlink PSCH are transmitted by using the first time resource, and the PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. In a subframe of FIG. 4(d), a downlink PCCH and/or a downlink PSCH are used for transmission of the PSCH in the first time resource, and are used for transmission of an uplink PSCH and/or PCCH after a gap for a processing delay, a time for switching from a downlink to an uplink, and generation of a transmit signal. Here, for example, the uplink signal may be used to transmit the uplink data, namely, the UL-SCH. In a subframe of FIG. 4(e), the entire subframe is used for uplink transmission (uplink PSCH or PCCH).

The above-described downlink part and uplink part may include multiple OFDM symbols as is the case with LTE.

Carrier aggregation will be described below.

In the present embodiment, one or multiple serving cells may be configured for the terminal apparatus 1. A technology in which the terminal apparatus 1 communicates via multiple serving cells is referred to as carrier aggregation or cell aggregation.

The multiple serving cells configured may include one Primary Cell (also referred to as PCell) and one or multiple Secondary Cells (also referred to as SCell). The primary cell is a serving cell in which an initial connection establishment procedure has been performed, a serving cell in which a connection re-establishment procedure has been initiated, or a cell indicated as a primary cell during a handover procedure. One or multiple secondary cells may be configured at a point of time when or after a Radio Resource Control (RRC) connection is established. However, the multiple serving cells configured may include one primary secondary cell (also referred to as Primary SCell, PSCell). The primary secondary cell may be a secondary cell capable of transmitting control information in the uplink among the one or more secondary cells configured for the terminal apparatus 1. The terminal apparatus 1 may be configured with a subset of two types of serving cells, a Master Cell Group (also referred to as MCG), and a Secondary Cell Group (also referred to as SCG). The master cell group includes one primary cell and zero or more secondary cells. The secondary cell group includes one primary secondary cell and zero or more secondary cells.

Time Division Duplex (TDD) and/or Frequency Division Duplex (FDD) may be applied to the radio communication system according to the present embodiment. Here, for the carrier aggregation, TDD or FDD may apply to one or all of the multiple serving cells. Alternatively, for the carrier aggregation, serving cells to which TDD applies and serving cells to which FDD applies may be aggregated.

A carrier corresponding to a serving cell in the downlink may be referred to as a downlink component carrier (or a downlink carrier). A carrier corresponding to a serving cell in the uplink may be referred to as an uplink component carrier (or an uplink carrier). A carrier corresponding to a serving cell in the sidelink may be referred to as a sidelink component carrier (or a sidelink carrier). The downlink component carrier, the uplink component carrier, and/or the sidelink component carrier may be collectively referred to as a component carrier (or a carrier).

Beamforming, beam management and/or beam sweeping according to the embodiment of the present invention will be now described.

Beamforming on the transmission side (which is the base station apparatus 3 in the case of the downlink, and is the terminal apparatus 1 in the case of the uplink) is a method of controlling, in an analogue or digital manner, the amplitude/phase of a signal for each of multiple transmit antenna elements to transmit the signal with a high transmit antenna gain in a selected direction, and a field pattern thereof is referred to as transmission beam. Further, beamforming on the reception side (which is the terminal apparatus 1 in the case of the downlink, and is the base station apparatus 3 in the case of the uplink) is a method of controlling, in an analogue or digital manner, the amplitude/phase of a signal for each of multiple receive antenna elements to receive the signal with a high receive antenna gain in a selected direction, and a field pattern thereof is referred to as reception beam. Beam management may be an operation of the base station apparatus 3 and/or the terminal apparatus 1 for acquiring the directivity alignment of transmission beams and/or reception beams, and beam gain.

Figure 5:
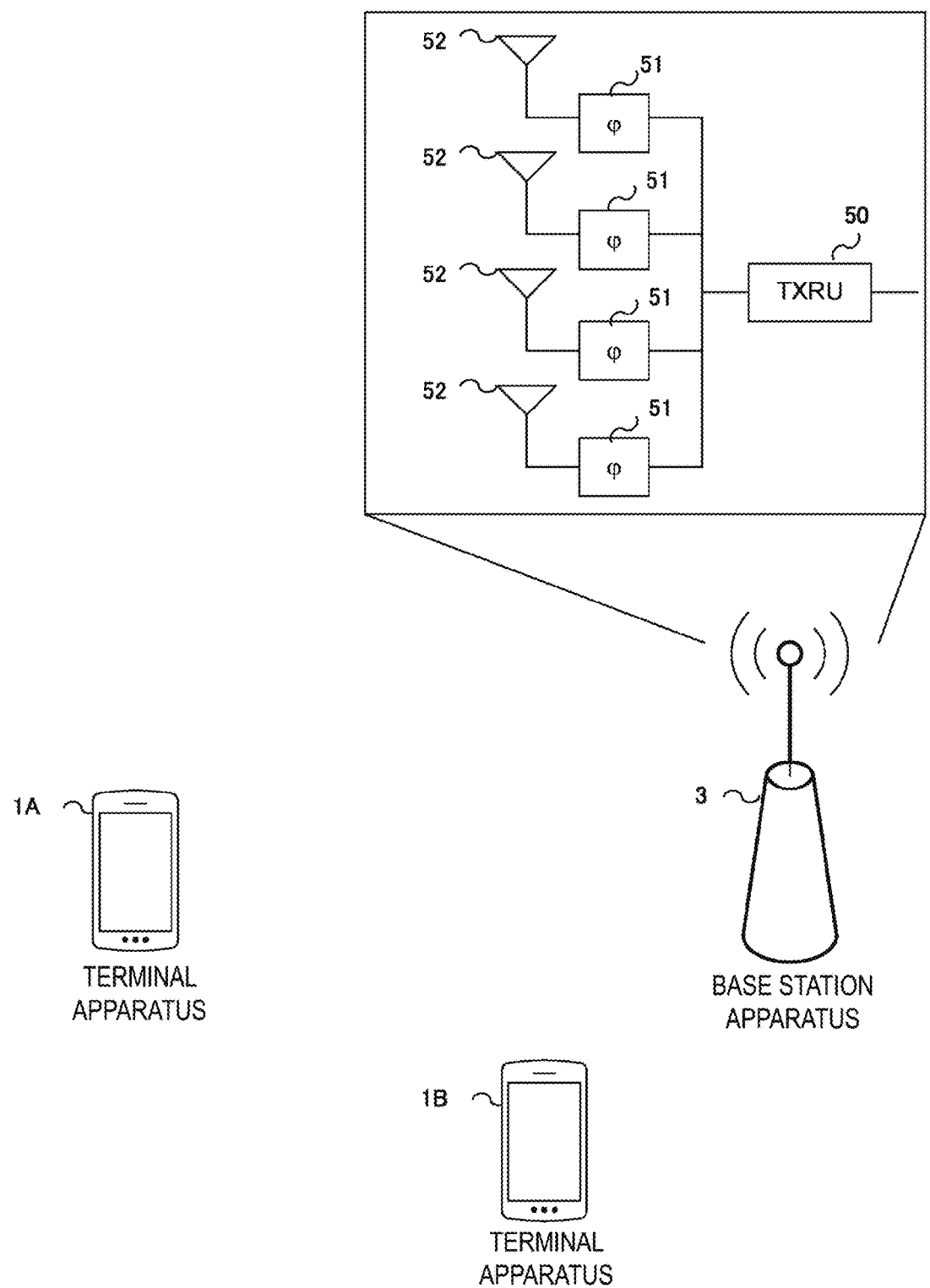
FIG. 5 is a diagram illustrating an example of beamforming according to an embodiment of the present invention.

FIG. 5 illustrates an example of beamforming. Multiple antenna elements are connected to one Transceiver unit (TXRU) 50. The phase is controlled by using a phase shifter 51 for each antenna element and a transmission is performed from an antenna element 52, thus allowing a beam for a transmit signal to be directed in any direction. Typically, the TXRU 50 may be defined as an antenna port, and only the antenna port may be defined for the terminal apparatus 1. Controlling the phase shifter 51 allows setting of directivity in any direction. Thus, the base station apparatus 3 can communicate with the terminal apparatus 1 by using a high gain beam.

The beamforming may be referred to as virtualization, precoding, and multiplication with a weight, for example. Further, a signal itself transmitted by using beamforming may be simply referred to as a transmission beam.

In the present embodiment, in the beamforming of uplink transmission, a transmission beam used by the terminal apparatus 1 is referred to as an uplink transmission beam (UL Tx beam), and in the beamforming of uplink reception, a reception beam used by the base station apparatus 3 is referred to as an uplink reception beam (UL Rx beam). In the beamforming of downlink transmission, a transmission beam used by the base station apparatus 3 is referred to as a downlink transmission beam (DL Tx beam), and in the beamforming of downlink reception, a reception beam used by the terminal apparatus 1 is referred to as downlink reception beam (DL Rx beam). Note that the uplink transmission beam and the uplink reception beam may be collectively referred to as an uplink beam, and the downlink transmission beam and the downlink reception beam may be collectively referred to as a downlink beam. Note that processing performed by the terminal apparatus 1 for the uplink beamforming may be referred to as uplink transmission beam processing or uplink precoding, and processing performed by the base station apparatus 3 for the uplink beamforming may be referred to as uplink reception beam processing. Note that processing performed by the terminal apparatus 1 for the downlink beamforming may be referred to as downlink reception beam processing and processing performed by the base station apparatus 3 for the downlink beamforming may be referred to as downlink transmission beam processing or downlink precoding.

However, the base station apparatus 3 may transmit a signal by using multiple downlink transmission beams in one OFDM symbol. For example, the antenna elements of the base station apparatus 3 may be divided into subarrays to perform downlink beamforming differently for each of the subarrays. Downlink beamforming may be performed differently for each polarization by using a polarization antenna. Similarly, the terminal apparatus 1 may transmit a signal by using multiple uplink transmission beams in one OFDM symbol.

However, in the present embodiment, a case is described in which the base station apparatus 3 switches and uses the multiple downlink transmission beams in a cell configured with the base station apparatus 3 and/or the transmission reception points 4, but an individual cell may be configured for each downlink transmission beam.

The beam management may include the following operations.
  Beam selection
  Beam refinement
  Beam recovery For example, the beam selection may be an operation for selecting a beam in communication between the base station apparatus 3 and the terminal apparatus 1. Furthermore, the beam refinement may be an operation for selecting a beam having a higher gain or changing a beam to an optimum beam between the base station apparatus 3 and the terminal apparatus 1 according to the movement of the terminal apparatus 1. The beam recovery may be an operation for re-selecting the beam in a case that the quality of a communication link is degraded due to blockage caused by a blocking object, a passing human being, or the like in communication between the base station apparatus 3 and the terminal apparatus 1. The above operations are not limited to the above purposes. The base station apparatus 3 may perform beam management in a variety of situations and, therefore, can exert an effect without limiting the purpose.

For example, a reference signal (for example, CSI-RS) or Quasi Co-Location (QCL) assumption may be used for the terminal apparatus 1 to select the transmission beam for the base station apparatus 3.

In a case that a Long Term Property of a channel on which one symbol in one antenna port is carried may be estimated from a channel on which one symbol in the other antenna port is carried, the two antenna ports are said to be in QCL. The long term property of the channel includes at least one of a delay spread, a Doppler spread, a Doppler shift, an average gain, or an average delay. For example, in a case that an antenna port 1 and an antenna port 2 are in QCL with respect to the average delay, this means that a reception timing for the antenna port 2 may be estimated from a reception timing for the antenna port 1.

The QCL may also be expanded to beam management. For this purpose, spatially expanded QCL may be newly defined. For example, one or more of the followings may be further included in addition to the above as Long term property of the channel in spatial QCL assumption.
  an Angle of Arrival (AoA), a Zenith angle of Arrival (ZoA), or the like and/or an angle spread, for example, an Angle Spread of Arrival (ASA) or a Zenith angle Spread of Arrival (ZSA) in a radio link or channel,
  a transmission angle (AoD, ZoD, or the like) and/or an Angle Spread, for example, an Angle Spread of Departure (ASD) or a Zenith angle Spread of Departure (ZSS) in a radio link or channel,
  Spatial Correlation.

According to this method, operation of the base station apparatus 3 and the terminal apparatus 1 equivalent to beam management may be defined as beam management based on the spatial QCL assumption and radio resources (time and/or frequency).

Note that an antenna port may be assigned to each of the precoding processing or each of the transmission beams. For example, a signal to be transmitted by using a different precoding processing or a signal to be transmitted by using a different transmission beam according to the present embodiment may be defined as a signal to be transmitted through a different antenna port or multiple different antenna ports. However, the antenna port is defined as an antenna port that allows a channel on which a certain symbol is transmitted through a certain antenna port to be inferred from a channel on which another symbol is transmitted through the same antenna port. The same antenna port also means that the antenna port number (the number for identifying an antenna port) may be the same. An antenna port set may be constituted by multiple antenna ports. The same antenna port set also means that the antenna port set number (the number for identifying an antenna port set) may be the same. A signal to be transmitted by applying a different terminal transmission beam also means that the signal may be transmitted through a different antenna port or a different antenna port set constituted by multiple antenna ports. A beam index may be an OFDM symbol number, an antenna port number, or an antenna port set number.

A complex modulation symbol for one or more layers generated by layer mapping is input into transform precoding. The transform precoding may be processing for dividing a block of complex-valued symbols into sets for each layer corresponding to one OFDM symbol. In a case where the OFDM is used, Discrete Fourier Transform (DFT) processing in the transform precoding may not be necessary. In the precoding, the block of vectors obtained from a transform precoder may be input to generate a block of vectors to be mapped to a resource element. In a case of spatial multiplexing, one of precoding matrices may be adapted in generating the block of vectors to be mapped to a resource element. This processing may be referred to as digital beamforming. Further, the precoding may be defined to include analog beamforming and digital beamforming, or may be defined as digital beamforming. The beamforming may be applied to a precoded signal, and the precoding may be applied to a signal to which the beamforming is applied. The beamforming may include digital beamforming and may not include analog beamforming, or may include both digital beamforming and analog beamforming. A beamformed signal, a precoded signal, or a beamformed and precoded signal may be referred to as a beam. A beam index may be a precoding matrix index. The beam index and the precoding matrix index may be defined independently. The precoding matrix indicated by the precoding matrix index may be applied to the beam indicated by the beam index to generate a signal. The beamforming indicated by the beam index may be applied to the signal to which the precoding matrix indicated by the precoding matrix index is applied, to generate a signal. The digital beamforming may adapt to a different precoding matrix for a resource in a frequency direction (for example, a set of subcarriers).

However, in the present embodiment, a radio link configured with a prescribed transmission beam and/or a prescribed reception beam may be referred to as a beam pair link. For example, in the downlink, a beam pair link configured using different downlink transmission beams and/or different downlink reception beams may be a different downlink beam pair link. For example, in the uplink, a beam pair link configured using different uplink transmission beams and/or different uplink reception beams may be a different uplink beam pair links. For example, a state in which the terminal apparatus 1 may receive downlink signals by using multiple downlink transmission beams and/or multiple downlink reception beams in a certain cell may be referred to as a state having multiple downlink beam pair links. For example, a state in which the terminal apparatus 1 may transmit uplink signals by using multiple uplink transmission beams and/or multiple uplink reception beams in a certain cell may be referred to as a state having multiple uplink beam pair links.

The concept of the downlink beam pair link according to the present embodiment will be described.

Figure 6:
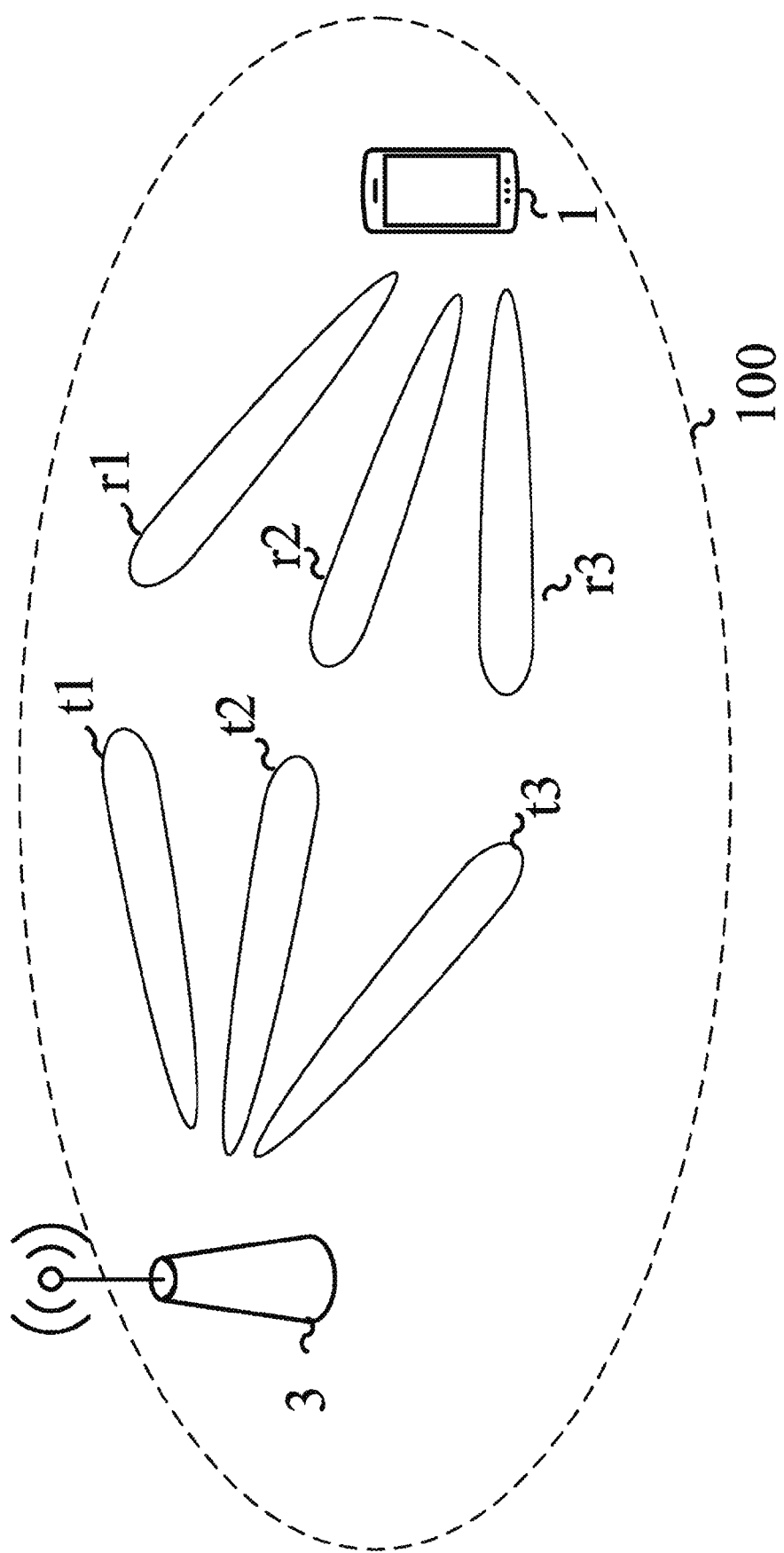
FIG. 6 is a diagram illustrating a concept in which multiple reference signals applied with transmission beams are transmitted in one or multiple cells according to an embodiment of the present invention.

FIG. 6 illustrates a case in which the terminal apparatus 1 and the base station apparatus 3 configure multiple downlink beam pair links in a cell 100. As the first downlink beam pair link, for a downlink signal transmitted from the base station apparatus 3 by using the downlink transmission beam t1, the terminal apparatus 1 receives the downlink signal using the downlink reception beam r1. As the second downlink beam pair link, for a downlink signal transmitted from the base station apparatus 3 by using the downlink transmission beam t2, the terminal apparatus 1 receives the downlink signal using the downlink reception beam r2. As the third downlink beam pair link, for a downlink signal transmitted from the base station apparatus 3 by using the downlink transmission beam t3, the terminal apparatus 1 receives the downlink signal using the downlink reception beam r3. In this case, three downlink beam pair links are configured between the terminal apparatus 1 and the base station apparatus 3, and downlink transmission and/or reception is performed in all or part of three downlink beam pair links. For example, the terminal apparatus 1 performs measurement of the received power and/or received quality by the reference signal in each downlink beam pair link.

However, multiple downlink beam pair links may be configured by using multiple downlink reception beams for one downlink transmission beam. However, multiple downlink beam pair links may be configured by using multiple downlink transmission beams for one downlink reception beam. However, regardless of the downlink reception beam to be used, one downlink beam pair link may be associated with one downlink transmission beam. However, regardless of the uplink transmission beam to be used, one uplink beam pair link may be associated with one uplink reception beam.

The concept of the downlink radio link (which may simply be referred to as a radio link) according to the present embodiment will be described.

In the present embodiment, only one downlink radio link may be configured for each serving cell. The downlink radio link may mean a downlink radio link associated with a serving cell independently of a downlink beam pair link associated with a beam. However, the downlink radio link may be one of multiple downlink beam pair links configured for a certain terminal apparatus 1 in the serving cell. However, the downlink radio link may be associated with two or more of multiple downlink beam pair links configured for a certain terminal apparatus 1 in the serving cell. For example, the terminal apparatus 1 may perform measurement of multiple received powers and/or received qualities by multiple reference signals in one downlink radio link.

Reporting of Beam State Information (BSI) (sometimes referred to as BSI reporting or Beam reporting) according to the present embodiment will be described.

The reporting of beam state information transmitted by the terminal apparatus 1 to the base station apparatus 3 may be a report of received power of each of one or multiple reference signals transmitted on the downlink of one or multiple serving cells from the base station apparatus 3. However, the received power of each of the one or multiple reference signals may be a received power in a case that the downlink reception beam having the highest power is used among the multiple downlink reception beams applicable by the terminal apparatus 1 in receiving each of the reference signals.

However, the reference signal for monitoring a beam state of a certain downlink beam pair link may be a reference signal for decoding an NR-PDCCH corresponding to the downlink beam pair link.

However, the reference signal for monitoring the beam state of the certain downlink beam pair link may be a CSI-RS (for example, non-zero power CSI-RS, and the like) associated with the downlink beam pair link. For example, the CSI-RS for monitoring a beam state of a certain downlink beam pair link may be a CSI-RS to which a downlink transmission beam corresponding to the downlink beam pair link has been applied.

However, the reference signal for monitoring a beam state of a certain downlink beam pair link may be a synchronization signal.

The reporting of the beam state information transmitted by the terminal apparatus 1 to the base station apparatus 3 may be index information indicating one or multiple of one or multiple reference signals transmitted from the base station apparatus 3. The terminal apparatus 1 may generate index information, based on the received powers of one or multiple reference signals received.

The terminal apparatus 1 according to the present embodiment may trigger the reporting of the beam state information to the base station apparatus 3 in the case of a prescribed condition in the MAC layer and/or the RRC layer. For example, the terminal apparatus 1 may trigger the reporting of the beam state information in a case that a beam pair link failure is detected. The reporting of the beam state information triggered may be cancelled in a case that a prescribed condition is met.

However, uplink resources used for the reporting of the beam state information may be an NR-PUSCH allocated by the base station apparatus 3. However, a prescribed MAC CE (hereinafter referred to as a BSI MAC CE) may be used for the reporting of the beam state information.

In a case that the terminal apparatus 1 determines that the reporting of the beam state information has been triggered and is not canceled, the terminal apparatus 1 may perform the following procedures.

In a case that the MAC entity of the terminal apparatus 1 has uplink resources for new transmission, the terminal apparatus 1 may generate a BSI MAC CE. However, the terminal apparatus 1 that has generated the BSI MAC CE may start or restart a timer for retransmission.

In a case that the MAC entity of the terminal apparatus 1 does not have uplink resources for new transmission and uplink grant is not configured, the terminal apparatus 1 may trigger a scheduling request or a beam recovery request.

A certain MAC PDU may include a MAC header, zero or one or more MAC Service Data Units (MAC SDUs), zero or one or more MAC CEs, and/or padding. The terminal apparatus 1 may transmit a MAC PDU including a BSI MAC CE to the base station apparatus 3.

The terminal apparatus 1 may cancel the reporting of the beam state information that has been triggered in a case that the BSI MAC CE is included in the MAC PDU to be transmitted.

However, there may be at most one report of beam state information that the MAC entity transmits in a Transmission Time Interval (TTI).

Figure 7:
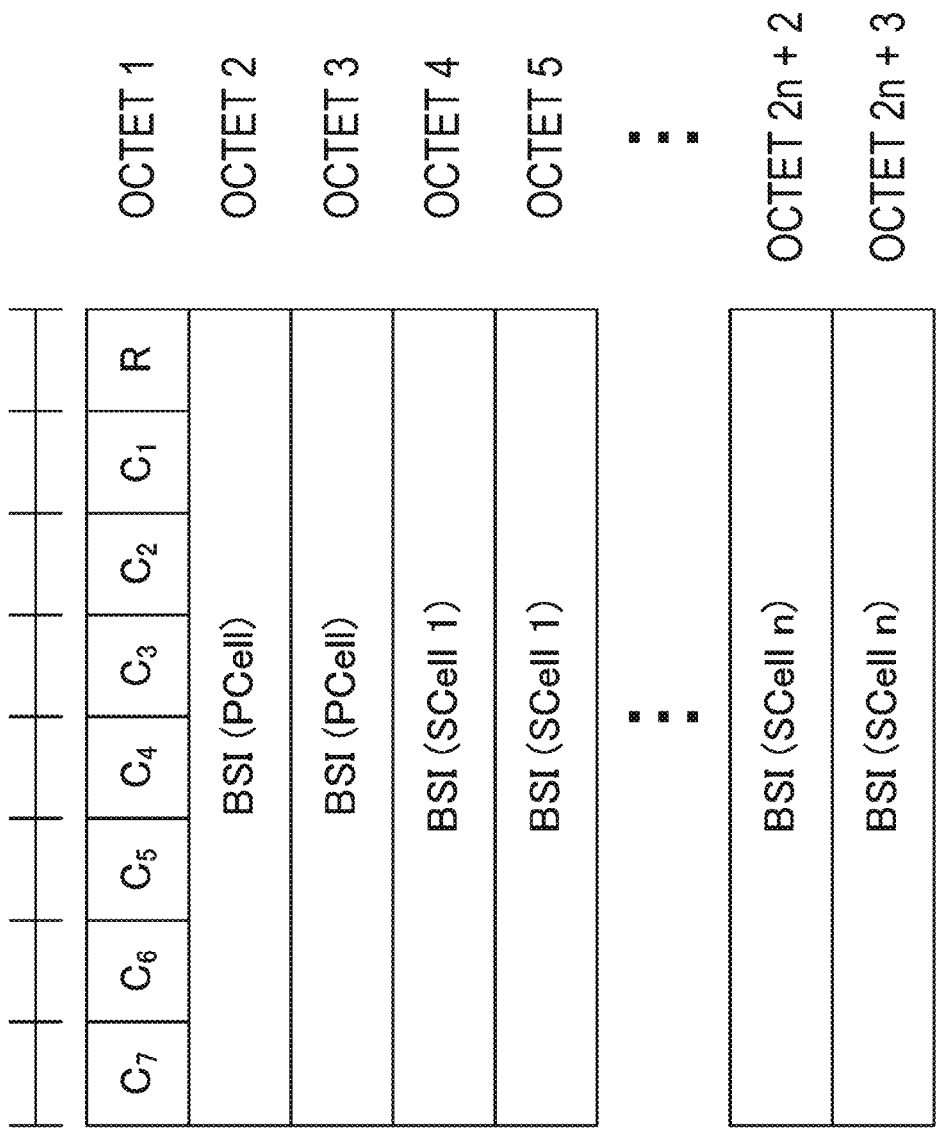
FIG. 7 is a diagram illustrating an example of a configuration of a BSI MAC CE according to an embodiment of the present invention.

FIG. 7 is an example of a configuration of a BSI MAC CE according to the present embodiment.

The BSI MAC CE may be identified by a MAC PDU sub-header. The size of the BSI MAC CE may vary. For example, in a case that the terminal apparatus 1 reports beam state information for each of the multiple serving cells, the size of the BSI MAC CE may be determined based on the number of serving cells reporting the beam state information. FIG. 7 illustrates an example in which the number of serving cells is 8. In the BSI MAC CE in FIG. 7, the first one octet (one octet indicates 8 bits) (octet 1) indicates the presence of beam state information for each SCell, and subsequent multiple octets (octet 2 to octet 2n+3) include fields of beam state information of serving cells (PCell and/or SCell) in which beam state information exists. However, in a case that beam state information of multiple serving cells is reported in one BSI MAC CE, fields of beam state information of multiple serving cells may be included with serving cell indexes in ascending order.

In FIG. 7, $C_i$ (i is a positive integer that satisfies $1 \leq i \leq 7$) is a field indicating the presence of beam state information in a SCell in which the SCell index is i. The $C_i$ field set with "1" indicates that beam state information of the Scell in which the SCell index is i is reported. The $C_i$ field set with "0" indicates that beam state information of the Scell in which the SCell index is i is not reported.

In FIG. 7, R is a reserved bit and may be set to "0." However, reserved bits may not be included in the BSI MAC CE.

In FIG. 7, the BSI is a field indicating beam state information of each of the PCell or 1st to n-th SCells (where n is the total number of SCells set with "1" for $C_i$) reporting beam state information. In FIG. 7, the BSI indicates a case that two octets are used for each serving cell.

However, in the example of FIG. 7, a case is indicated that the maximum value of the number of serving cells (PCell/SCell) corresponding to beam state information reported in one BSI MAC CE is eight, but the number may correspond to more than eight serving cells. For example, in a case that the maximum value of the number of serving cells is 16, the first two octets may be used for $C_i$ (where i is a positive integer that satisfies $1 \leq i \leq 15$), and in a case that the maximum value of the number of serving cells is 64, the first four octets may be used for $C_i$ (i is a positive integer that satisfies $1 \leq i \leq 63$).

However, the field of $C_i$ included in the BSI MAC CE only indicates the presence of beam state information in a SCell in the example of FIG. 7, but may be a field indicating the presence of beam state information in a PCell, SCell, and/or PSCell.

However, the fields of the BSI included in the BSI MAC CE uses two octets for each serving cell in the example of FIG. 7, but other sizes may be used, and the size may not be a constant factor of one octet. For example, some or all of the fields of the BSI of the multiple serving cells may be included in one octet, or some or all of the fields in the BSI and other fields such as $C_i$ may be included in one octet.

The fields of the BSI included in the BSI MAC CE may include a value indicating measurement quality of one or multiple downlink beam pair links. However, the measurement quality of the downlink beam pair link may be a received power of the downlink reference signal (referred to as Reference Signal Received Power (RSRP), L1-RSRP, or the like), CSI and/or a received quality of the downlink reference signal (Reference Signal Received Quality (RSRQ)). However, the measurement quality of one downlink beam pair link may be information of m bits indicated by 2 m levels.

The fields of the BSI included in the BSI MAC CE may include a field for identifying one or more of multiple downlink beam pair links. For example, the field for identifying one or more of the multiple downlink beam pair links may be an index indicating a resource of the downlink reference signal. For example, the field for identifying one or more of the multiple downlink beam pair links may be an index of an antenna port. For example, the field for identifying one or more of the multiple downlink beam pair links may be a combination of an index of an antenna port and an index of time. However, the field for identifying one or more of the multiple downlink beam pair links may be information indicated by a bitmap.

The fields of the BSI included in the BSI MAC CE may include a field for identifying a group including multiple downlink beam pair links.

Figure 8:
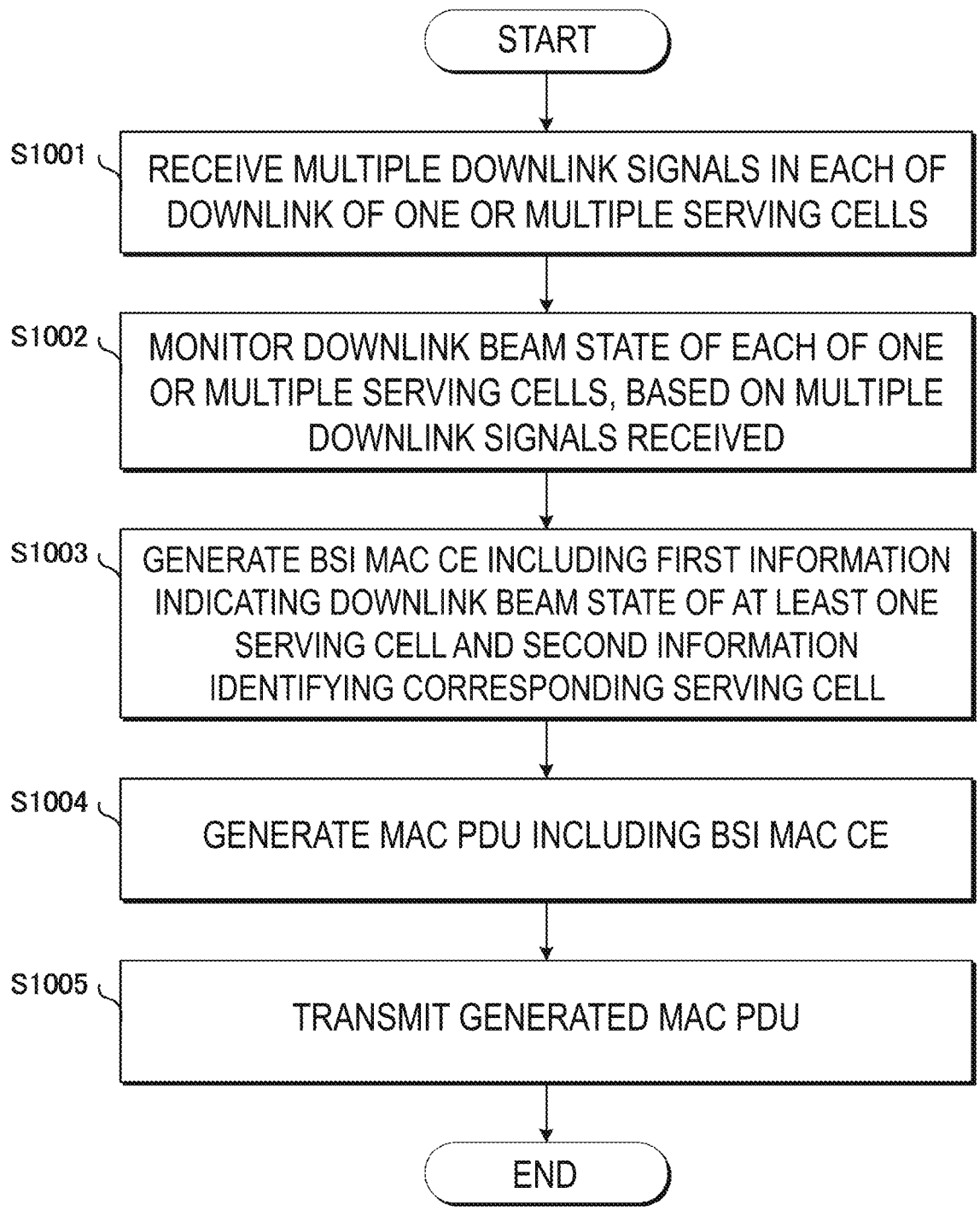
FIG. 8 is a flowchart illustrating an example of reporting of beam state information in a terminal apparatus 1 according to an embodiment of the present invention.

FIG. 8 is a flowchart illustrating an example of reporting of beam state information in the terminal apparatus 1 according to the present embodiment. The terminal apparatus 1 receives multiple downlink signals in each of the downlink of one or multiple serving cells (S1001). The terminal apparatus 1 monitors a downlink beam state of each of the one or multiple serving cells, based on the multiple downlink signals received (S1002). The terminal apparatus 1 generates a BSI MAC CE including first information indicating a downlink beam state of at least one serving cell and second information identifying a corresponding serving cell. The terminal apparatus 1 generates a MAC PDU including a BSI MAC CE (S1004) and transmits the generated MAC PDU to the base station apparatus 3 (S1005).

Figure 9:
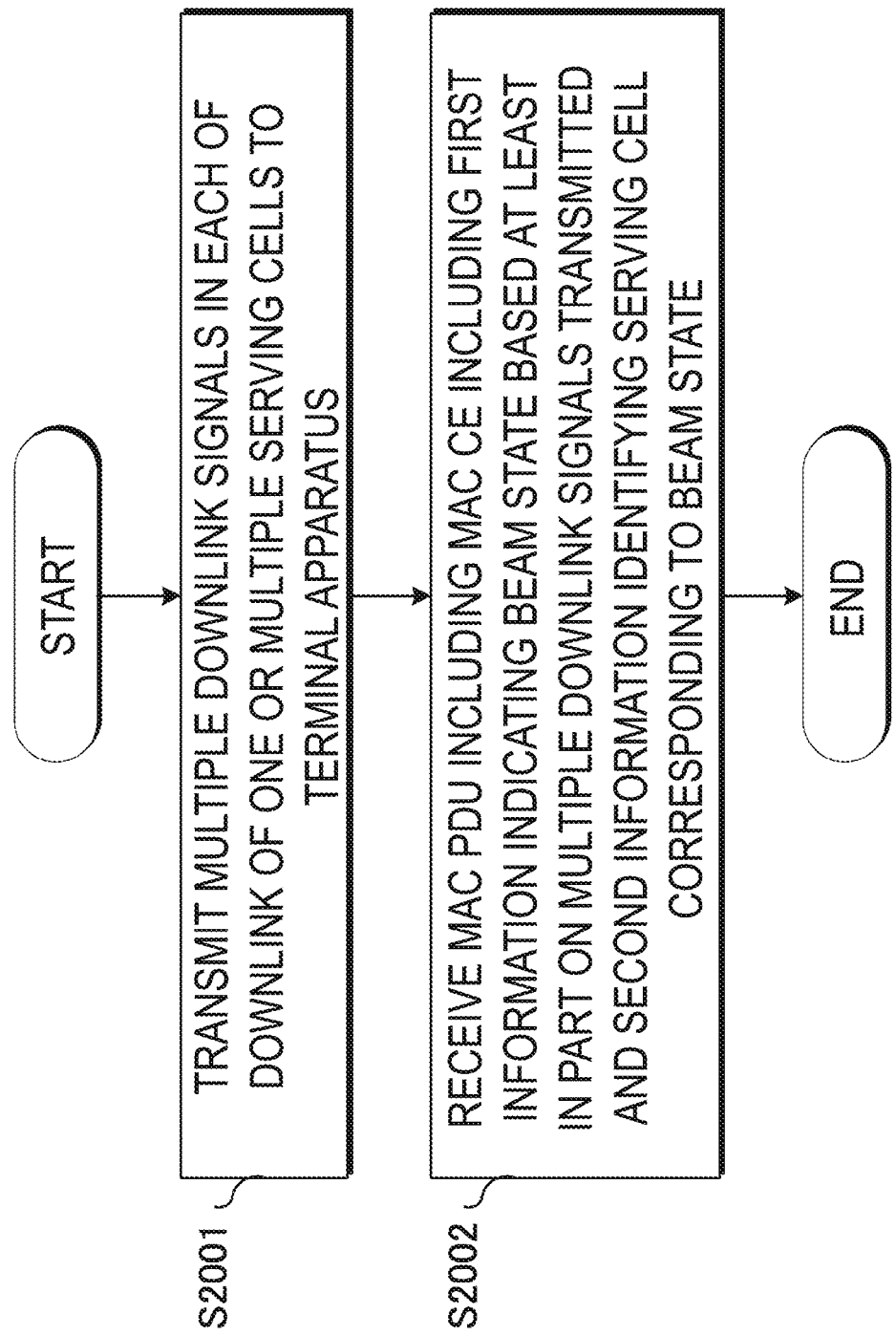
FIG. 9 is a flowchart illustrating an example of reception of beam state information in a base station apparatus 3 according to an embodiment of the present invention.

FIG. 9 is a flowchart illustrating an example of reception of beam state information in the base station apparatus 3 according to the present embodiment. The base station apparatus 3 transmits, to the terminal apparatus 1, multiple downlink signals in each of the downlink of one or multiple serving cells (S2001). The base station apparatus 3 receives a MAC PDU including a MAC CE including first information indicating a beam state based at least in part on the multiple downlink signals transmitted and second information identifying a serving cell corresponding to the beam state (S2002).

Configurations of apparatuses according to the present embodiment will be described below.

Figure 10:
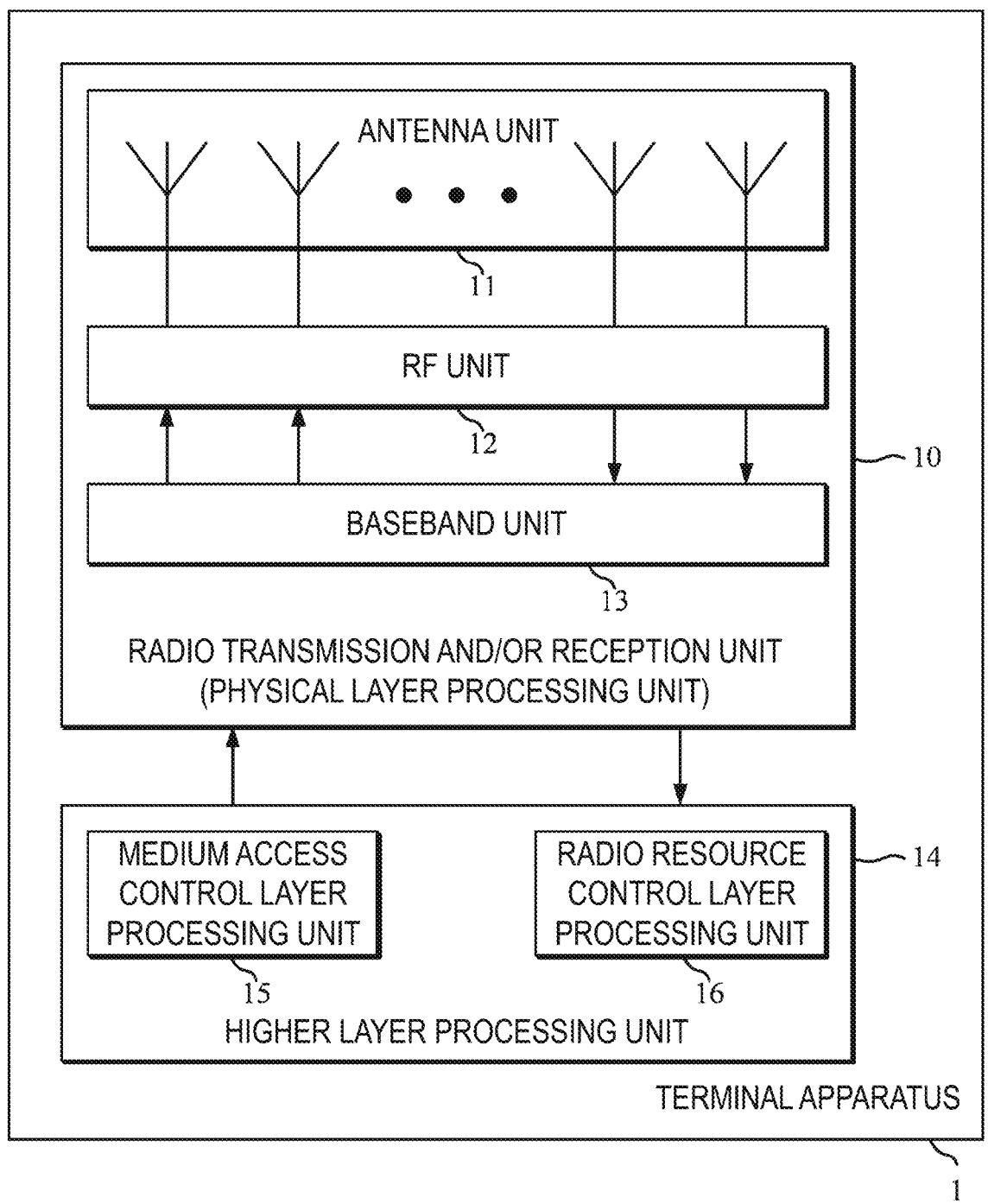
FIG. 10 is a schematic block diagram illustrating a configuration of the terminal apparatus 1 according to an embodiment of the present invention.

FIG. 10 is a schematic block diagram illustrating the configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, a monitor unit, or a physical layer processing unit. The higher layer processing unit 14 is also referred to as a measurement unit or a controller.

The higher layer processing unit 14 outputs uplink data (which may be referred to as a transport block) generated by a user operation or the like, to the radio transmission and/or reception unit 10. The higher layer processing unit 14 performs some or all of the processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the MAC layer (Medium Access Control layer). The medium access control layer processing unit 15 controls transmission of a scheduling request, based on various types of configuration information/parameters managed by the radio resource control layer processing unit 16. The medium access control layer processing unit 15 may control the transmission of a beam state information report. The medium access control layer processing unit 15 does MAC PDU. The medium access control layer processing unit 15 may generate a MAC PDU including a BSI MAC CE. The medium access control layer processing unit 15 is also referred to as a generation unit.

The radio resource control layer processing unit 16 included in the higher layer processing unit 14 performs processing of the RRC layer (Radio Resource Control layer). The radio resource control layer processing unit 16 manages various types of configuration information/parameters of the terminal apparatus 1. The radio resource control layer processing unit 16 sets various types of configuration information/parameters based on a higher layer signal received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The radio transmission and/or reception unit 10 may have a function of receiving information for identifying a configuration of multiple reference signals in one or multiple serving cells. The radio transmission and/or reception unit 10 may have a function of receiving multiple reference signals. The radio transmission and/or reception unit 10 may have a function of monitoring received qualities of multiple downlink beam pair links, based on one or multiple reference signals received.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, adds CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. The RF unit 12 may include a function of determining the transmission power of an uplink signal and/or an uplink channel transmitted in the serving cell. The RF unit 12 is also referred to as a transmit power control unit.

Figure 11:
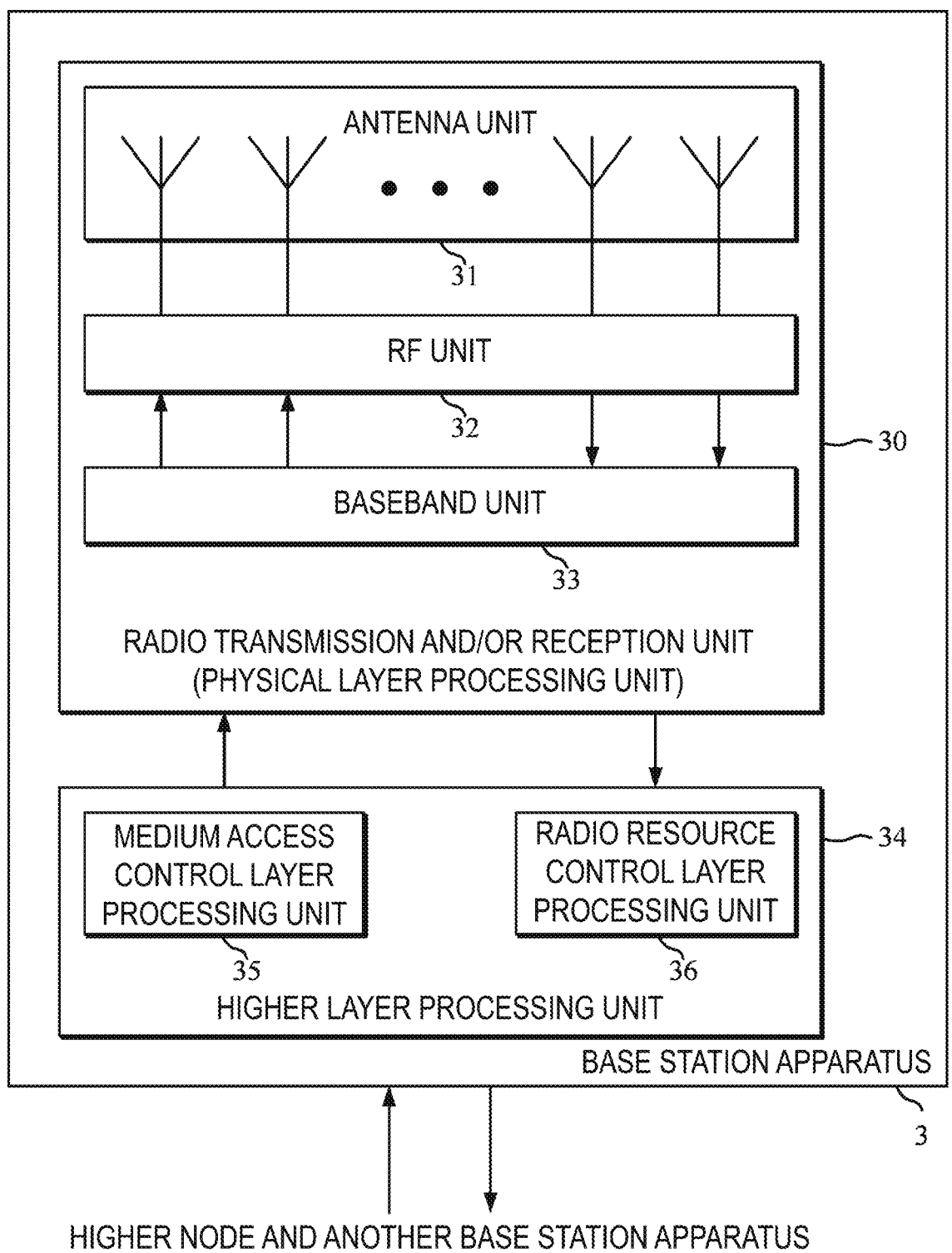
FIG. 11 is a schematic block diagram illustrating a configuration of the base station apparatus 3 according to an embodiment of the present invention.

FIG. 11 is a schematic block diagram illustrating the configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. A controller controlling operations of the units based on various conditions may be separately provided. The higher layer processing unit 34 is also referred to as a terminal control unit.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the MAC layer. The medium access control layer processing unit 35 performs processing associated with a scheduling request, based on various types of configuration information/parameters managed by the radio resource control layer processing unit 36. The medium access control layer processing unit 35 may perform processing on a beam recovery request. The medium access control layer processing unit 35 may perform processing on a beam state information report.

The radio resource control layer processing unit 36 included in the higher layer processing unit 34 performs processing of the RRC layer. The radio resource control layer processing unit 36 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/broadcasts information for indicating various types of configuration information/parameters. The radio resource control layer processing unit 36 may transmit/broadcast information for identifying a configuration of multiple reference signals in a certain cell.

The radio transmission and/or reception unit 30 has a function of transmitting multiple reference signals in each of the one or multiple serving cells. The terminal apparatus 1 may have a function of receiving a scheduling request transmitted by using any one of the multiple scheduling request resources configured by the higher layer processing unit 34. The radio transmission and/or reception unit 30 may have a function of transmitting information for identifying a configuration of multiple reference signals in a certain cell. In addition, a part of the functionality of the radio transmission and/or reception unit 30 is similar to the functionality of the radio transmission and/or reception unit 10, and hence description thereof is omitted. Note that in a case that the base station apparatus 3 is connected to one or more transmission reception points 4, some or all of the functions of the radio transmission and/or reception unit 30 may be included in each of the transmission reception points 4.

Further, the higher layer processing unit 34 transmits (transfers) or receives control messages or user data between the base station apparatuses 3 or between a higher network apparatus (MME, S-GW (Serving-GW)) and the base station apparatus 3. Although, in FIG. 9, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an application layer processing unit exist in the higher layer processing unit 34. The higher layer processing unit 34 may have a function of configuring multiple scheduling request resources corresponding to multiple reference signals transmitted from the radio transmission and/or reception unit 30.

Note that "units" in the drawing refer to constituent elements to realize the functions and the procedures of the terminal apparatus 1 and the base station apparatus 3, which are also represented by the terms such as a section, a circuit, a constituting apparatus, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 and the base station apparatus 3 according to the present invention will be described below.

(1) A first aspect of the present invention is a terminal apparatus 1 including: a receiver 10 configured to receive multiple downlink signals in downlink in one or multiple serving cells; a monitor unit 10 configured to monitor a beam state of the downlink in each of the one or multiple serving cells, based on the multiple downlink signals received in the downlink of each of the one or multiple serving cells; a generation unit 15 configured to generate a BSI MAC CE (which may be referred to as a first MAC CE) including first information indicating the beam state of the downlink of at least one of the one or multiple serving cells and second information identifying a serving cell of the one or multiple serving cells corresponding to the beam state indicated by the first information, and generate a MAC PDU (which may be referred to as a first MAC PDU) including the BSI MAC CE; and a transmitter 10 configured to transmit the MAC PDU.

(2) In the first aspect of the present invention, the number of bits of the BSI MAC CE may be determined, based on the number of the one or multiple serving cells corresponding to the beam state indicated by the first information.

(3) In the first aspect of the present invention, each of the multiple downlink signals may be a reference signal.

(4) In the first aspect of the present invention, each of the multiple downlink signals may be a synchronization signal.

(5) In the first aspect of the present invention, the first information may include information indicating one or multiple received powers (which may be RSRP) corresponding to one or some of the multiple downlink signals received in the downlink of a corresponding one of the one or multiple serving cells.

(6) In the first aspect of the present invention, the first information may include information identifying one or some of the multiple downlink signals received in the downlink of the corresponding one of the one or multiple serving cells.

(7) A second aspect of the present invention is a base station apparatus 3 including: a transmitter 30 configured to transmit multiple downlink signals in downlink in one or multiple serving cells to a terminal apparatus 1; and a receiver 30 configured to receive a MAC PDU (which may be referred to as a first MAC PDU) including a BSI MAC CE (which may be referred to as a first MAC CE) from the terminal apparatus 1. The BSI MAC CE includes first information indicating a beam state of the downlink of at least one of the one or multiple serving cells and second information identifying a serving cell of the one or multiple serving cells corresponding to the beam state indicated by the first information. The beam state of the downlink indicated by the first information is based on the multiple downlink signals.

(8) In the second aspect of the present invention, the number of bits of the BSI MAC CE may be determined, based on the number of the one or multiple serving cells corresponding to the beam state indicated by the first information.

(9) In the second aspect of the present invention, each of the multiple downlink signals may be a reference signal.

(10) In the second aspect of the present invention, each of the multiple downlink signals may be a synchronization signal.

(11) In the second aspect of the present invention, the first information may include information indicating one or multiple received powers (which may be RSRP) corresponding to one or some of the multiple downlink signals received in the downlink of a corresponding one of the one or multiple serving cells.

(12) In the second aspect of the present invention, the first information may include information identifying one or some of the multiple downlink signals received in the downlink of the corresponding one of the one or multiple serving cells.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application relates to the application of Application No. JP2017-154085, filed Aug. 9, 2017, and claims priority based on the above application. The contents of the above application are included herein by reference.

REFERENCE SIGNS LIST 1 (1A, 1B) Terminal apparatus
3 Base station apparatus
4 Transmission reception point (TRP)
10 Radio transmission and/or reception unit
11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit
50 Transceiver unit (TXRU)
51 Phase shifter
52 Antenna element

The invention claimed is:

1. A terminal device comprising:
reception circuitry configured to receive multiple reference signals on one or more Secondary Cells (SCells);
generation circuitry configured to generate a first Medium Access Control Control Element (MAC CE) including one or more first fields and one or more second fields, and configured to generate a first Medium Access Control Protocol Data Unit (MAC PDU) including the first MAC CE; and
transmission circuitry configured to transmit the first MAC PDU; wherein
the one or more first fields are associated to the one or more SCells, respectively;
the first field for an SCell of the one or more SCells indicates a presence of the second field for the SCell of the one or more SCells;
the second field includes first information; and
the first information indicates an index of one of the multiple reference signals associated to the SCell of the one or more SCells based on reception power of the multiple reference signals associated to the SCell of the one or more SCells.

2. The terminal device according to claim 1, wherein each of the multiple reference signals is a synchronization signal.

3. The terminal device according to claim 1, wherein each of the multiple reference signals is a Channel State Information Reference Signal (CSI-RS).

4. A base station device comprising:
transmission circuitry configured to transmit multiple reference signals on one or more Secondary Cells (SCells);
reception circuitry configured to receive a first Medium Access Control Protocol Data Unit (MAC PDU) including a first Medium Access Control Control Element (MAC CE) including one or more first fields and one or more second fields; wherein
the one or more first fields are associated to the one or more SCells, respectively;
the first field for an SCell of the one or more SCells indicates a presence of the second field for the SCell of the one or more SCells;
the second field includes first information; and
the first information indicates an index of one of the multiple reference signals associated to the SCell of the one or more SCells based on reception power of the multiple reference signals associated to the SCell of the one or more SCells.

5. The base station device according to claim 4, wherein each of the multiple reference signals is a synchronization signal.

6. The base station device according to claim 4, wherein each of the multiple reference signals is a Channel State Information Reference Signal (CSI-RS).

7. A communication method used for a terminal apparatus, the communication method comprising:
receiving multiple reference signals on one or more Secondary Cells (SCells);
generating a first Medium Access Control Control Element (MAC CE) including one or more first fields and one or more second fields, and generating a first Medium Access Control Protocol Data Unit (MAC PDU) including the first MAC CE; and
transmitting the first MAC PDU; wherein
the one or more first fields are associated to the one or more SCells, respectively;
the first field for an SCell of the one or more SCells indicates a presence of the second field for the SCell of the one or more SCells;
the second field includes first information; and
the first information indicates an index of one of the multiple reference signals associated to the SCell of the one or more SCells based on reception power of the multiple reference signals associated to the SCell of the one or more SCells.

8. A communication method used for a base station apparatus, the communication method comprising:
transmitting multiple reference signals on one or more Secondary Cells (SCells);
receiving a first Medium Access Control Protocol Data Unit (MAC PDU) including a first Medium Access Control Control Element (MAC CE) including one or more first fields and one or more second fields; wherein
the one or more first fields are associated to the one or more SCells, respectively;
the first field for an SCell of the one or more SCells indicates a presence of the second field for the SCell of the one or more SCells;
the second field includes first information; and
the first information indicates an index of one of the multiple reference signals associated to the SCell of the one or more SCells based on reception power of the multiple reference signals associated to the SCell of the one or more SCells.

* * * * *